US012007243B2

(12) United States Patent
Zhen et al.

(10) Patent No.: US 12,007,243 B2
(45) Date of Patent: Jun. 11, 2024

(54) TRAFFIC LANE LINE FITTING METHOD AND SYSTEM

(71) Applicant: GREAT WALL MOTOR COMPANY LIMITED, Hebei (CN)

(72) Inventors: Longbao Zhen, Hebei (CN); Jianyong Ge, Hebei (CN); Rutao Han, Hebei (CN); Long Li, Hebei (CN); Wei Li, Hebei (CN); Jian Gao, Hebei (CN); Kai Zhang, Hebei (CN); Lin He, Hebei (CN); Lu Zhang, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 339 days.

(21) Appl. No.: 17/281,561

(22) PCT Filed: Sep. 27, 2019

(86) PCT No.: PCT/CN2019/108403
§ 371 (c)(1),
(2) Date: Mar. 30, 2021

(87) PCT Pub. No.: WO2020/063817
PCT Pub. Date: Apr. 2, 2020

(65) Prior Publication Data
US 2021/0389153 A1    Dec. 16, 2021

(30) Foreign Application Priority Data
Sep. 30, 2018   (CN) .......................... 201811154050.X (51) Int. Cl.
*G01C 21/36*    (2006.01)
*B60W 30/12*    (2020.01)
*G01C 21/00*    (2006.01)

(52) U.S. Cl.
CPC ......... *G01C 21/3658* (2013.01); *B60W 30/12* (2013.01); *G01C 21/3889* (2020.08); *B60W 2556/50* (2020.02)

(58) Field of Classification Search
CPC .......... G01C 21/3658; G01C 21/3889; B60W 30/12; B60W 2556/50
See application file for complete search history.

(56) References Cited

U.S. PATENT DOCUMENTS 8,311,283 B2    11/2012  Wu et al.
2001/0037165 A1 11/2001  Shirai et al.
(Continued)

FOREIGN PATENT DOCUMENTS

CN    102529975 A    7/2012
CN    102667888 A    9/2012
(Continued)

OTHER PUBLICATIONS

Search Report from European Application No. 19866854.3 dated Oct. 14, 2021 (4 pages).
(Continued)

*Primary Examiner* — Kira Nguyen
(74) *Attorney, Agent, or Firm* — Calfee, Halter & Griswold LLP (57) ABSTRACT

A traffic lane line fitting method includes: obtaining map information for a current position of a vehicle, the map information comprising a number of traffic lanes, a road width and line point information of traffic lane lines on both sides of the vehicle; determining, from among the traffic lane lines on both sides of the vehicle, a traffic lane line on one side, consistent with the direction indicated by at least one of the following, to be a traffic lane line offset reference used for traffic lane line fitting; offsetting and generating a plurality of traffic lane lines of the vehicle on the basis of the
(Continued)

traffic lane line offset reference; performing curve fitting on a set of line points on the generated plurality of traffic lane lines so as to obtain a corresponding traffic lane line equation.

15 Claims, 8 Drawing Sheets

(56) References Cited

U.S. PATENT DOCUMENTS

| | | | |
|---|---|---|---|
| 2007/0168113 A1* | 7/2007 | Litkouhi | G01C 21/26 701/532 |
| 2010/0238283 A1 | 9/2010 | Ho | |
| 2010/0268452 A1* | 10/2010 | Kindo | G01C 21/3658 345/632 |
| 2010/0332127 A1* | 12/2010 | Imai | B60W 30/12 701/532 |
| 2011/0010021 A1 | 1/2011 | Kobayashi | |
| 2011/0109745 A1 | 5/2011 | Nakatani et al. | |
| 2014/0200801 A1 | 7/2014 | Tsuruta et al. | |
| 2015/0145664 A1 | 5/2015 | You et al. | |
| 2018/0111613 A1* | 4/2018 | Oh | G06V 20/588 |
| 2018/0165525 A1* | 6/2018 | Hamada | G01C 21/30 |
| 2018/0190122 A1 | 7/2018 | Guarneri et al. | |
| 2019/0113925 A1* | 4/2019 | Sim | G05D 1/0214 |

FOREIGN PATENT DOCUMENTS

| | | |
|---|---|---|
| CN | 103465909 A | 12/2013 |
| CN | 103832433 A | 6/2014 |
| CN | 104670229 A | 6/2015 |
| CN | 105260699 A | 1/2016 |
| CN | 105300401 A | 2/2016 |
| CN | 105528588 A | 4/2016 |
| CN | 105588576 A | 5/2016 |
| CN | 106096525 A | 11/2016 |
| CN | 106525056 A | 3/2017 |
| CN | 107392103 A | 11/2017 |
| JP | 2001283391 A | 10/2001 |
| JP | 2009214786 A | 9/2009 |
| JP | 2009237901 A | 10/2009 |
| JP | 2010218528 A | 9/2010 |
| JP | 2014136480 A | 7/2014 |
| JP | 201701046 A | 1/2017 |
| JP | 2017033080 A | 2/2017 |
| KR | 101502511 B1 | 3/2015 |
| WO | 2010004689 A1 | 1/2010 |

OTHER PUBLICATIONS

Huval et al. "An Empirical Evaluation of Deep Learning on Highway Driving", C0RR (ARXIV), vol. 1504.01716v3, Apr. 7, 2015, pp. 1-7.

English Translation of International Search Report from PCT/CN2019/108403 dated Jan. 2, 2020 (3 pages).

Luo, Qiang. Science-Engineering (B), China Doctoral Dissertations Full-Text Database. Departure and Lane-Changing Model for Highway Driving Safety Warning, No. No. 12, Dec. 15, 2014, and its English abstract.

* cited by examiner

TRAFFIC LANE LINE FITTING METHOD AND SYSTEM

CROSS-REFERENCE TO RELATED APPLICATIONS

This application is the National Stage of International Application No. PCT/CN2019/108403, filed on Sep. 27, 2019, which claims priority to Chinese Patent Application No. 201811154050.X, filed on Sep. 30, 2018, which are incorporated herein by reference in their entireties.

FIELD OF THE INVENTION

The present invention relates to the field of intelligent transportation, in particular to a lane line fitting method and system.

BACKGROUND OF THE INVENTION

At present, vehicles with an Autonomous Driving System (ADS) are gradually brought to the market, which greatly promotes the development of intelligent transportation. The ADS senses a surrounding environment in real time by using an environment sensing system installed on a vehicle, and determines a drivable area of the vehicle through data returned by a sensor. Environment sensing contents can be divided into two main parts, namely, road information and target information, respectively. Lane line information in the road information can provide driving path information for the vehicle, which is convenient for the realization of functions such as lane changing and lane maintaining for lateral control. In addition, the lane line information can also provide a reference for screening a target in a road in the environment sensing system.

Therefore, it can be known that lane line detection is crucial to ADS, and in order to ensure driving safety of an autonomous driving vehicle, the prior art requires that an environment sensing system acquires the lane line information around the vehicle as much as possible while sensing the surrounding environment. However, when the road is changed such as bifurcated or joins, the lane lines directly output by the sensor may be multiple and relatively complex, and cannot be directly used for decision-making and control of a vehicle behavior.

SUMMARY OF THE INVENTION

In view of this, the present invention aims to provide a lane line fitting method to solve the technical problem that extracted lane lines are multiple and relatively complex in the prior art.

To achieve the above object, a technical solution of the present invention is implemented as follows:

A lane line fitting method comprises:
acquiring map information for a current position of a vehicle, wherein the map information comprises the number of lanes, a road width and line point information of lane lines on two sides of the vehicle;
determining, from among the lane lines on two sides of the vehicle, a lane line on one side, consistent with the direction indicated by at least one of the following, to be a lane line offset reference used for lane line fitting: a lane changing direction side, indicating the side to which the vehicle is expected to perform lane changing in the current road; a reference side of a driving coordinate system, wherein the driving coordinate system takes a road boundary line on one side of the road on which the vehicle is located as a reference, and takes a road guide line direction and a direction following a left-hand rule with the road guide line direction as two axes; a road width unchanged side, indicating the side where the road width does not change in the road ahead of the vehicle; and a lane continuous side, indicating the side where the lane continuity does not change in the current road; and
offsetting based on the lane line offset reference to generate a plurality of lane lines of the vehicle, and performing curve fitting on a set of line points on the plurality of generated lane lines to obtain a corresponding lane line equation.

Furthermore, the method may further comprise: acquiring a decision-making lane changing signal and/or navigation information for the current position of the vehicle, wherein the decision-making lane changing signal indicates the lane changing direction side of the vehicle, and the navigation information is used for indicating the road width unchanged side.

Furthermore, the method may further comprise: setting the priority of determining the lane line offset reference based on the lane changing direction side, the road width unchanged side, the lane continuous side and the reference side of the driving coordinate system.

Furthermore, the method may further comprise: determining an actual road working condition of the vehicle according to the map information, and selecting, according to the actual road working condition, one or more of the lane changing direction side, the road width unchanged side, the lane continuous side and the reference side of the driving coordinate system to determine the lane line offset reference. Wherein, the actual road working condition and the selected lane line offset reference comprise any one of the following: in the case that the actual road working condition is a separated roadbed, a conventional ramp, a conventional main road, ramp bifurcation or departure from a high-speed lane, the lane changing direction side and/or the reference side of the driving, coordinate system are/is selected to determine the lane line offset reference; in the case that the actual road working condition is main road narrowing, the road width unchanged side is selected to determine the lane line offset reference; and in the case that the actual road working condition is ramp merging or ramp-main road joining, the lane continuous side and/or the reference side of the driving coordinate system are/is selected to determine the lane line offset reference.

Furthermore, the method may further comprise: completely or partially deleting, by combining the map information, a lane line that is outside the road boundary of the current road or affected by a road obstacle from the plurality of lane lines.

Compared with the prior an, the lane line fitting method according to the present invention has the following advantages: the lane line fitting method according to the embodiments of the present invention can accurately and quickly determine a lane line offset reference used for lane line fitting, and outputs an effective lane line based on the lane line offset reference, facilitates lane maintaining and other controls, solves the problem that extracted lane lines are numerous and relatively complex in the prior art, can be adapted to different road scenes, and has high processing efficiency of lane line algorithm.

Another object of the present invention is to provide a lane line fitting system to solve the technical problem that extracted lane lines are multiple and relatively complex in the prior art.

To achieve the above object, a technical solution of the present invention is implemented as follows:

A lane line fitting system comprises:

an information acquisition unit, used for acquiring map information for a current position of a vehicle, wherein the map information comprises the number of lanes, a road width and line point information of lane lines on two sides of the vehicle;

a reference determination unit, electrically connected to the information acquisition unit, and used for determining, from among the lane lines on two sides of the vehicle, a lane line on one side, consistent with the direction indicated by at least one of the following, to be a lane line offset reference used for lane line fitting: a lane changing direction side, indicating the side to which the vehicle is expected to perform lane changing in the current road; a reference side of a driving coordinate system, wherein the driving coordinate system takes a road boundary line on one side of the road on which the vehicle is located as a reference, and takes a road guide line direction and a direction following a left-hand rule with the road guide line direction as two axes; a road width unchanged side, indicating the side where the road width does not change in the road ahead of the vehicle; and a lane continuous side, indicating the side where the lane continuity does not change in the current road; and a lane line fitting unit, electrically connected to the information acquisition unit and the reference determination unit, and used for offsetting based on the lane line offset reference to generate a plurality of lane lines of the vehicle, and performing, curve fitting on a set of line points on the plurality of generated lane lines to obtain a corresponding lane line equation.

Furthermore, the information acquisition unit may be further used for acquiring a decision-making lane changing signal and/or navigation information for the current position of the vehicle, wherein the decision-making lane changing signal indicates the lane changing direction side of the vehicle, and the navigation information is used for indicating the road width unchanged side.

Furthermore, the system may further comprise: a priority setting unit, used for setting the priority of determining the lane line offset reference based on the lane changing direction side, the road width unchanged side, the lane continuous side and the reference side of the driving coordinate system. Wherein the reference determination unit is further electrically connected to the priority setting unit, and used for determining the lane line offset reference based on the priority, set by the priority setting unit, of determining the lane line offset reference based on the lane changing direction side, the road width unchanged side, the lane continuous side and the reference side of the driving coordinate system.

Furthermore, the system may further comprise: a road working condition determination unit, used for determining an actual road working condition of the vehicle according to the map information, wherein the reference determination unit is also electrically connected to the road working condition determination unit, and used for selecting, according to the actual road working condition, one or more of the lane changing direction side, the road width unchanged side, the lane continuous side and the reference side of the driving coordinate system to determine the lane line offset reference.

Wherein, the actual road working condition and the selected lane line offset reference comprise any one of the following: in the case that the actual road working condition is a separated roadbed, a conventional ramp, a conventional main road, ramp bifurcation or departure from a high-speed lane, the lane changing direction side and or the reference side of the driving coordinate system are/is selected to determine the lane line offset reference; in the case that the actual road working condition is main road narrowing, the road width unchanged side is selected to determine the lane line offset reference; and in the case that the actual road working condition is ramp merging or ramp-main road joining, the lane continuous side and/or the reference side of the driving coordinate system are/is selected to determine the lane line offset reference.

Furthermore, the system may further comprise: a lane line screening, unit, electrically connected to the lane line fitting unit, and used for completely or partially deleting, by combining the map information, a lane line that is outside the road boundary of the current road or affected by a road obstacle from the plurality of lane lines.

The lane line fitting system and the aforementioned lane line fitting method have the same advantages over the prior art, and details are not described here.

Another object of the present invention is to provide a machine-readable storage medium, wherein an instruction is stored on the machine-readable storage medium, and the instruction is used for causing a controller to execute the above-mentioned lane line fitting method.

Other features and advantages of the present invention will be described in detail in the specific embodiments below.

BRIEF DESCRIPTION OF DRAWINGS

The drawings, which form a part of the present invention, are used to provide a further understanding of the present invention. The exemplary embodiments of the present invention and the description thereof are used to explain the present invention, and do not constitute an improper limitation on the present invention. In the drawings:

FIG. 8(*a*) is a schematic diagram of lane line fitting for a separated roadbed. FIG. 8(*b*) is a schematic diagram of lane line fitting for a conventional ramp, FIG. 8(*c*) is a schematic diagram of lane line fitting for a conventional main road, FIG. 8(*d*) is a schematic diagram of lane line fitting for ramp bifurcation, and FIG. 8(*e*) is a schematic diagram of lane line fitting for departure from a high-speed lane;

FIG. 10 (*a*) is a schematic diagram of lane line fitting for ramp merging, and FIG. 10 (*b*) is a schematic diagram of lane line fitting for ramp-main road joining;

FIG. 11(*a*) is a schematic diagram of deleting a lane line outside the road boundary of the current road, and FIG. 11(*b*) is a schematic diagram of deleting a lane line affected by a road obstacle.

DETAILED DESCRIPTION OF THE EMBODIMENTS

It should be noted that, in the case of no conflict, the embodiments of the present invention and features in the embodiments can be combined with each other.

In the embodiments of the present invention, "electrical connection" is used to describe the signal connection between two components, such as a control signal and a feedback signal, and an electrical power connection between two components. In addition, the "connection" involved in the embodiments of the present invention can be a wired connection or a wireless connection, and the "electrical connection" involved can be a direct electrical connection between two components or an indirect electrical connection through another component.

The present invention will be described in detail below with reference to the drawings and embodiments.

Figure 1:
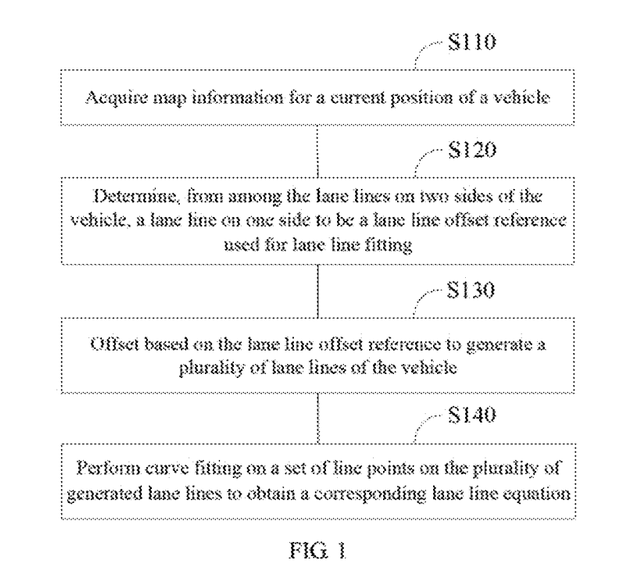
FIG. 1 is a schematic flowchart of a lane line fitting method according to an embodiment of the present invention.

FIG. 1 is a schematic flowchart of a lane line fitting method according to an embodiment of the present invention, wherein the lane line fitting method is used for an autonomous driving vehicle. As shown in FIG. 1, the lane line fitting method comprises:

Step S110, acquiring map information for a current position of a vehicle.

The map information comprises the number of lanes, a road width and line point information of lane lines on two sides of the vehicle. In a more preferred embodiment, the map information can further comprise a road type, road feature points, a lane width, and the like. The road feature points are points that can represent a specific position of a road in a road scene, such as the start point and end point of a certain road section.

The map information is preferably high-precision map information. Those skilled in the art know that the high-precision map information can show the above-mentioned road type, number of lanes, road width, road feature points, and line points of the lane lines on two sides of the vehicle, lane width and other information. The high-precision imp divides the road into a set of map points section by section, and the map output will divide the road from the position where the road changes, and will also give the relevant map information of the current road and the next road section.

Step S120, determining, from among the lane lines on two sides of the vehicle, a lane line on one side to be a lane line offset reference used for lane line fitting.

Specifically, in Step S120, it is determined, from among the lane lines on two sides of the vehicle, that a lane line on one side, consistent with the direction indicated by at least one of the following, is a lane line offset reference used for lane line fitting:

1) A lane changing direction side, indicating the side to which the vehicle is expected to perform lane changing in the current road.

The lane line fitting method according to the present invention can further comprise: acquiring a decision-making lane changing signal for the current position of the vehicle, wherein the decision-making lane changing signal indicates the lane changing direction side of the vehicle.

The decision-making lane changing signal can be given by a decision-making system of the autonomous driving vehicle, wherein the decision-making system determines whether to perform lane changing of the vehicle according to current vehicle data, road data, target data and the like, and gives a corresponding decision-making lane changing signal, such as lane maintaining (not changing a lane), leftwards lane changing with lane changing uncompleted, rightwards lane changing with lane changing uncompleted, and having a lane changing signal with lane changing completed.

2) A reference side of a driving coordinate system.

Figure 2:
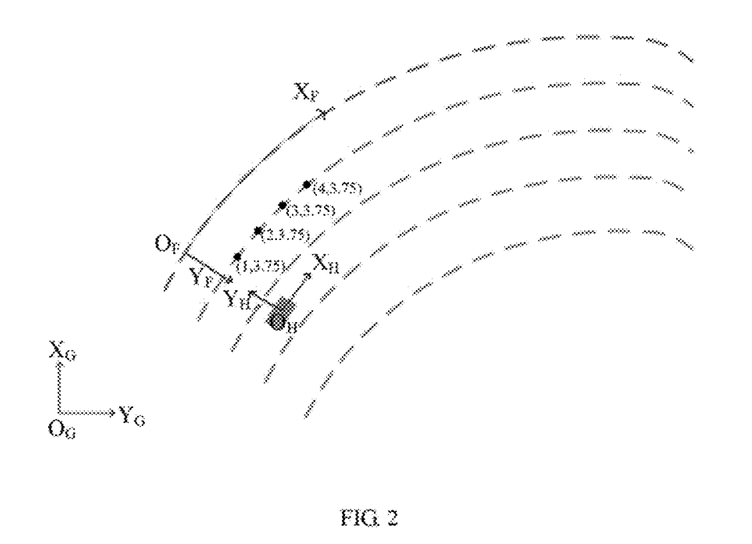
FIG. 2 is a schematic diagram of a driving coordinate system $X_F O_F Y_F$, a global coordinate system $X_G O_G Y_G$ and a vehicle coordinate system $X_H O_H Y_H$ according to an embodiment of the present invention.

The driving coordinate system takes a road boundary line on one side of the road on which the vehicle is located as a reference, and takes a road guide line direction and a direction following a left-hand rule with the road guide line direction as two axes. FIG. 2 is a schematic diagram of a driving coordinate system $X_F O_F Y_F$ a global coordinate system $X_G O_G Y_G$ and a vehicle coordinate system $H_H H_H Y_H$ according to an embodiment of the present invention. As shown in FIG. 2, the global coordinate system $X_G O_G Y_G$ is based on the geodetic coordinate system, $X_G$ points to the north, $Y_G$ points to the east, the angle direction is clockwise as positive, and the angle range is [0, 360°]. Map lane line information and the like are given based on the global coordinate system. The vehicle coordinate system $X_H O_H Y_H$ is based on the vehicle, wherein $X_H$ points to the longitudinal axis of the vehicle and $Y_H$ points to the horizontal axis of the vehicle. Following the right-hand rifle, counterclockwise is positive. The output information of the sensors of the camera, War, and millimeter wave radar on the vehicle is given based on the vehicle coordinate system. According to the definitions of the global coordinate system and the vehicle coordinate system, the driving coordinate system according to the embodiment of the present invention can be correspondingly expressed as $X_F O_F Y_F$, which is coordinate system established on the road boundary line and completely consistent with the road trend. After the origin $O_F(X_{Fo}, Y_{Fo})$ is determined, the arc length distance between each point on the road boundary line and the driving coordinate origin $O_F(X_{Fo}, Y_{Fo})$ can be calculated as the driving ordinate $X_{Fi}$ of each point. Therefore, the longitudinal axis $X_F$ of the driving coordinate system is completely consistent with the road trend, and the driving, abscissa of each reference line point is $Y_{Fi}=0$. Thus, the vehicle position, the lane line, the target and the like can be given based on the driving coordinate system, particularly in the bend working condition, the arc length distance of the real bend is taken as target distance information to be output, and compared with the lane coordinate system, error in target area attribute and effective distance can be avoided. In addition, if each lane line is described by a point in the driving coordinate system, it is easy to know that the abscissas of points on the lane line in the driving, coordinate system are the same, and only the ordinates are different, for example, referring to FIG. 2, the ordinates increase sequentially on the selected lane line, and the abscissas are all 3.75. Therefore, the lane line can be described by using the ordinates of the lane line in the driving coordinate system.

Based on the established driving coordinate system, the direction information (whether the driving coordinate system is established on the left side or the right side of the road) on the reference side of the driving coordinate system can be obtained, and then according to the position points, output by the high-precision map, of the lane lines on two sides of the vehicle, the side consistent with the reference side of the driving coordinate system in direction is determined as a lane line, offset reference.

In addition, the reference side of the driving coordinate system can be switched, and the switching rifle is, for example, taking a preset default road boundary line as the reference line; switching to a road boundary line on the navigation direction side indicated by the navigation direction information; maintaining the current reference line unchanged if the road on which the vehicle is currently located is a ramp, and switching to the default road boundary line if the road on which the vehicle is currently located is a main road.

3) A road width unchanged side, indicating the side where the road width does not change in the road ahead of the vehicle.

The lane line fitting method according to the present invention can further comprise: acquiring navigation information for the current position of the vehicle, wherein the navigation information is used for indicating the road width unchanged side. Specifically, the navigation information is obtained by, for example, a vehicle-mounted navigation system having a GPS positioning function, and can indicate a change (narrowing on the left side, widening on the left side, narrowing on the right side, and widening on the right side, etc.) in width of the road ahead in real time, and then according to the position points, output by the high-precision map, of the lane lines on two sides of the vehicle, determine the side consistent with the road width unchanged side as the lane line offset reference.

4) A lane continuous side, indicating the side where the lane continuity does not change in the current road.

For example, in the case of a freeway with no change in the road width but a change in the number of lanes, there is certainly a case where the lane is continuous on one side and discontinuous on the other side, and thus the lane line offset reference can be determined according to the lane continuous side.

Step S130, offsetting based on the lane line offset reference to generate a plurality of lane lines of the vehicle.

Preferably, step S130 can comprise the following steps: calculating a heading angle of each line point on the lane line offset reference; and offsetting for the preset lane width to the left and/or right based on a coordinate, heading angle and preset lane width corresponding to each line point on the lane line offset reference to generate a plurality of lane lines of the vehicle. The calculation equation is explained as follows:

Original points: $(x(1),x(2),x(3), \ldots, x(n); y(1), y(2), y(3), \ldots, y(n))$.

Calculate heading angle information:

$yaw(1)=a \tan 2((y(1)),x(1)))*180/pi$ $yaw(2)==: a \tan 2((y(2)-y(1)),(x(2)-x(1)))*180/pi;$ $yaw(3)=a \tan 2((y(3)-y(2)),(x(3)-x(2)))*180/pi;$ $yaw(n)=a \tan 2((y(n)-y(n-1)),(x(n)-x(n-1)))*180/pi;$ The offset equation for points on the lane line (offset to the right) is as follows:

$X(i)=x(i)+LaneWidth\_m*\sin(yaw(i));$ $Y(i)=y(i)-LaneWidth\_m*\cos(yaw(i));$

LaneWidth_m represents the lane width (generally, the default lane width is 3.75 m).

It should be noted that the lane lines on two sides of the vehicle in the embodiment of the present invention refer to the left lane line and the right lane line adjacent to the vehicle, and do not comprise the left-left lane line (that is, lane line further to the lea), the right-right lane line (that is, lane line further to the right), etc. The plurality of lane lines mentioned here comprise lane lines on two sides of the vehicle, as well as a left-left lane line and a right-right lane line that are lanes to the left or right of the lane lines on two sides of the vehicle, etc.

Step S140, performing curve fitting on a set of line points on the plurality of generated lane lines to obtain a corresponding lane line equation.

Preferably, the error of the fitted lane line is large due to the error caused by its own fitting using the fitted lane line equation, and the lane line information of the original high-precision map is also given in the form of continuous points. Therefore, the operation in the form of points is maintained during the intelligent lane line offset to ensure equidistant offset, and the fitting, operation is not performed three times until the final lane line information is given and given in the form of cubic equation parameters.

The following will give a comprehensive description by exemplifying the lane line fitting method of the embodiment of the present invention. In this example, the map information is exemplified by a high-precision map. For ease of description, four examples of lane line fitting based on the lane changing direction side, the driving coordinate system, the road width unchanged side and the lane continuous side are respectively described below.

I. Lane Line Fitting Based on a Lane Changing Direction Side.

Figure 3:
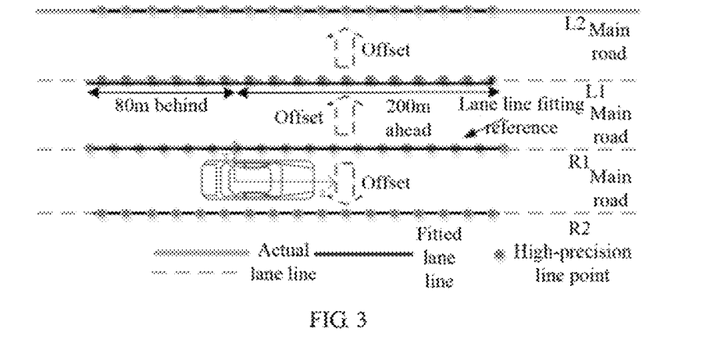
FIG. 3 is a schematic diagram of an example of lane line fitting based on a lane changing direction side according to an embodiment of the present invention.

FIG. 3 is a schematic diagram of an example of lane line fitting based on a lane changing direction side according to an embodiment of the present invention. In this example, the lane line fitting rule in the lane changing state is as follows: according to the position points, output by the high-precision map, of the lane lines on two sides of the vehicle, the high-precision map point information (the high-precision map point position of 200 m ahead and 80 m behind) on the lane changing direction side is selected to assign the corresponding side lane line; at this time, the vehicle is in a leftwards lane changing state, then position points on the left side of the vehicle on the high-precision map are assigned R1, and R1 is used as the lane line offset reference; then according to the lane width information on the left side and right side of the current position and the lane width information at the next 100 m of the current lane, position point offset processing is performed to obtain L1 and L2, and then the points on the corresponding lane line are fitted three times to obtain the lane line equation. Here, the high-precision map only outputs the width at the next 100 m of the current lane in which the vehicle is located and the lane width information on the left and right side of the current position of the vehicle, and the left-left lane width information cannot be obtained, so the offset is temporarily based on a fixed 3.75 m.

II. Lane Line Fitting Based on a Reference Side of a Driving Coordinate System.

Figure 4:
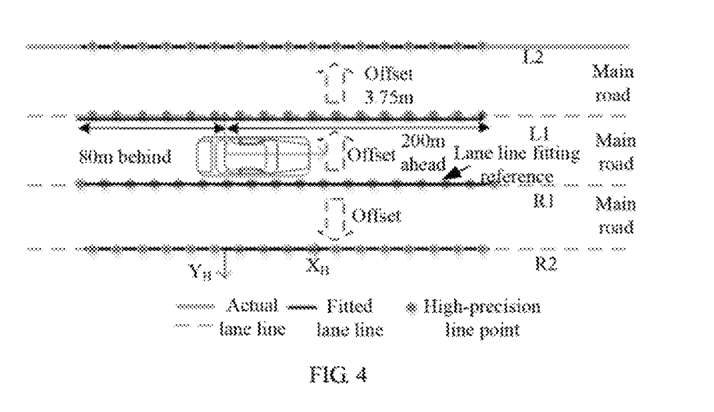
FIG. 4 is a schematic diagram of an example of lane line fitting based on a reference side of a driving coordinate system according to an embodiment of the present invention.

FIG. 4 is a schematic diagram of an example of lane line fitting based on a reference side of a driving coordinate system according to an embodiment of the present invention. In this example, the lane line fitting rule in the driving coordinate system is as follows: according to the established driving coordinate system, the direction information (whether the driving coordinate system is established on the left side or the right side of the road) of the reference side of the driving coordinate system can be obtained; according to the position points, output by the high-precision map, of the lane lines on two sides of the vehicle, the high-precision map point information (the high-precision map point position of 200 m ahead and 80 m behind) on the direction side of the reference side of the driving coordinate system is selected to assign the corresponding side lane line; at this time, the vehicle is in a lane maintaining state, the reference side of the driving coordinate system is on the right side of the road, and R1 is used as the lane line offset reference; then according to the lane width information on the left side and right side of the current position and the lane width information at the next 100 m of the current lane, position point onset processing is performed to obtain other lane lines, and then the points on the corresponding lane line are fitted three times to obtain the lane line equation.

III. Lane Line Fitting Based on a Road Width Unchanged Side.

Figure 5:
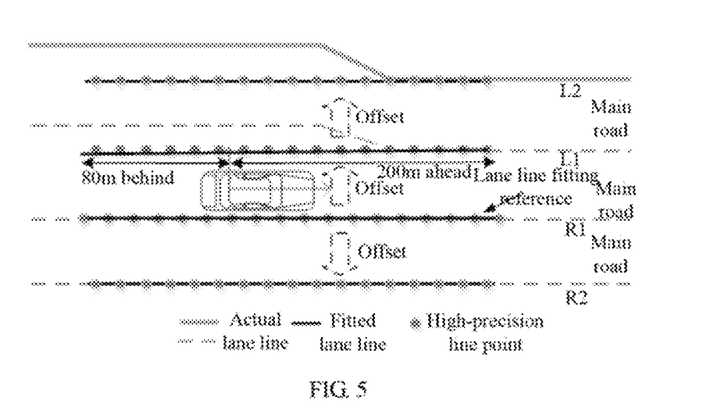
FIG. 5 is a schematic diagram of an example of lane line fitting based on a road width unchanged side according to an embodiment of the present invention.

FIG. 5 is a schematic diagram of an example of lane line fitting based on a road width unchanged side according to an embodiment of the present invention. In this example, the lane line fitting rule with the road width unchanged side as a reference is as follows: since a navigation signal can indicate a change in width of the road ahead (narrowing on the left side, widening on the left side, narrowing on the right side, and widening on the right side) according to the position points, output by the high-precision map, of the lane lines on two sides of the vehicle, the high-precision map point information (the high-precision map point position of 200 m ahead and 80 m behind) on the road width unchanged side is selected to assign the corresponding side lane line; as shown in FIG. 5, the road ahead is narrowing on the left side, then the position points on the right side of the vehicle on the high-precision map are assigned R1 as the lane line offset reference; then according to the lane width information on the left side and right side of the position at the next 100 m and the lane width information at the next 100 m of the current lane, position point offset processing is performed to obtain other lane lines, and then the points on the corresponding lane line are fitted three times to obtain the lane line equation.

IV. Lane Line Fitting Based on a Lane Continuous Side.

Figure 6:
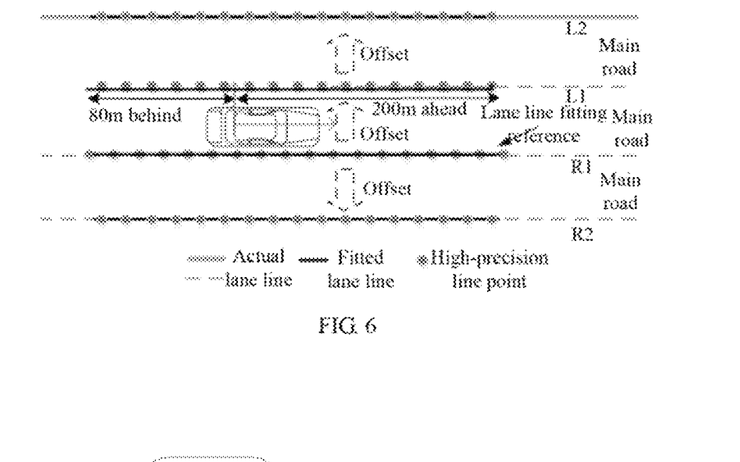
FIG. 6 is a schematic diagram of an example of lane line fitting based on a lane continuous side according to an embodiment of the present invention.

FIG. 6 is a schematic diagram of an example of lane line fitting based on a lane continuous side according to an embodiment of the present invention. In this example, the lane line fitting rule with the lane continuous side as a reference is as follows: due to the case of a freeway with no change in the road width but a change in the number of lanes, there is certainly a case where the lane is continuous on one side and discontinuous on the other side; according to the position points, output by the high-precision map, of the lane lines on two sides of the vehicle, the high-precision map point information (the high-precision map point position of 200 m ahead and 80 m behind) on the lane continuous side is selected to assign the corresponding side lane line as shown in the figure, at this time, the vehicle is in a lane maintaining state, and the lane on the right side is continuous, then the position points on the right side of the vehicle on the high-precision map are assigned R1 as the lane line offset reference; then according to the lane width information on the left side and right side of the current position and the lane width information at the next 100 m of the current lane, position point offset processing is performed to obtain other lane lines, and then the points on the corresponding lane line are fitted three times to obtain the lane line equation.

Here, some conditions may apply to more than one of the above lane line fitting schemes based on the lane changing direction side, the reference side of the driving coordinate system, the road width unchanged side and the lane continuous side. To avoid repetitive execution of lane line fitting, in a preferred embodiment, the lane line fitting method according to the embodiment of the present invention can further comprise: setting the priority of determining the lane line offset reference based on the lane changing direction side, the road width unchanged side, the lane continuous side and the reference side of the driving coordinate system.

Figure 7:
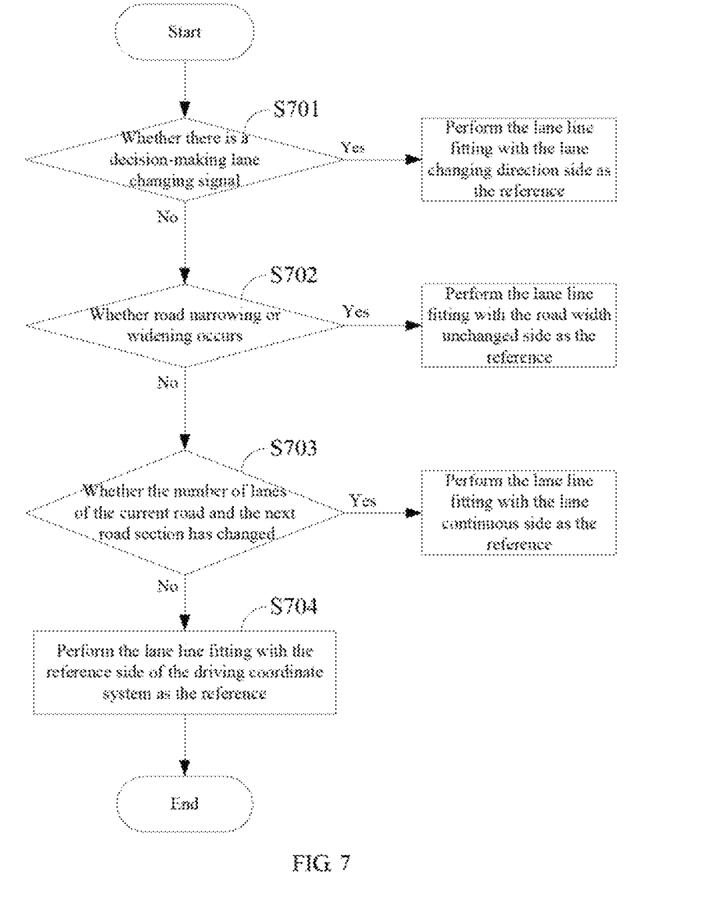
FIG. 7 is a schematic diagram of an example of lane line fitting by the priority of determining the lane line offset reference based on the lane changing direction side, the road width unchanged side, the lane continuous side and the reference side of the driving coordinate system according to an embodiment of the present invention.

FIG. 7 is a schematic diagram of an example of lane line fitting by the priority of determining the lane line offset reference based on the lane changing direction side, the road width unchanged side, the lane continuous side and the reference side of the driving coordinate system according to an embodiment of the present invention. In this example, the order of the priority from high to low is the lane changing direction side, the road width unchanged side, the lane continuous side, the reference side of the driving coordinate system. As shown in NG. 7, the method can comprise the following steps:

Step S701, judging whether there is a decision-making lane changing signal, if so, performing the lane line fitting with the lane changing direction side as the reference, otherwise performing step S702.

Step S702, judging whether road narrowing or widening occurs, if so, performing the lane line fitting with the road width unchanged side as the reference, otherwise performing step S703.

When the lane line fitting is performed with the road width unchanged side as the reference, it is necessary to combine actual road working conditions, such as whether the road is widening or narrowing, whether the road widening end point is passed, or whether the left side or right side is widening or narrowing, etc., to determine the lane line offset reference, and then fit the lane line. For example, when the road is narrowing, if the left side is narrowing, the lane line on the right side is used as the lane line offset reference for offsetting other lane lines; and if the right side is narrowing, the lane line on the left side is used as the lane line offset reference for offsetting other lane lines. It can also be judged whether the road width at the next 100 m is less than the set threshold value, and if so, a state signal can be given to the decision-making system of the autonomous driving vehicle at the same time. For another example, when the road is widening, it is judged whether the road widening end point is passed; if so, the left side is widening and the lane line on the right side is used as the lane line offset reference for offsetting other lane lines; if the right side is widening, the lane line on the left side is used as the lane line offset reference for offsetting other lane lines; if the road widening end point is not passed, if the left side is widening, the lane line on the right side is used as the lane line offset reference for offsetting for the original road width to obtain other lane lines; if the right side is widening, the lane line on the left side is used as the lane line offset reference for offsetting for the original road width to obtain other lane lines.

Step S703, judging whether the number of lanes of the current road and the next road section has changed, if so, performing the lane line fitting with the lane continuous side as the reference, otherwise performing step S704.

When performing the lane line fitting with the lane continuous side as the reference, if the number of lanes on two sides is continuous, step S704 is directly executed.

Step S704: performing the lane line fitting with the reference side of the driving coordinate system as the reference.

Further, the above four lane line fitting schemes based on the lane changing direction side, the reference side of the driving coordinate system, the road width unchanged side and the lane continuous side are applicable to a variety of road working conditions. In a preferred embodiment, the lane line fitting method further comprises: determining an actual road working condition of the vehicle according to the map information, and selecting, according to the actual road working condition, one or more of the lane changing direction side, the road width unchanged side, the lane continuous side and the reference side of the driving coordinate system to determine the lane line offset reference.

For example, the actual road working condition and the selected lane line offset reference can comprise any one of the following:

1) In the case that the actual road working condition is a separated roadbed, a conventional ramp, a conventional main road, ramp bifurcation or departure from a high-speed lane, the lane changing direction side and/or the reference side of the driving coordinate system are/is selected to determine the lane line offset reference.

Figure 8A:
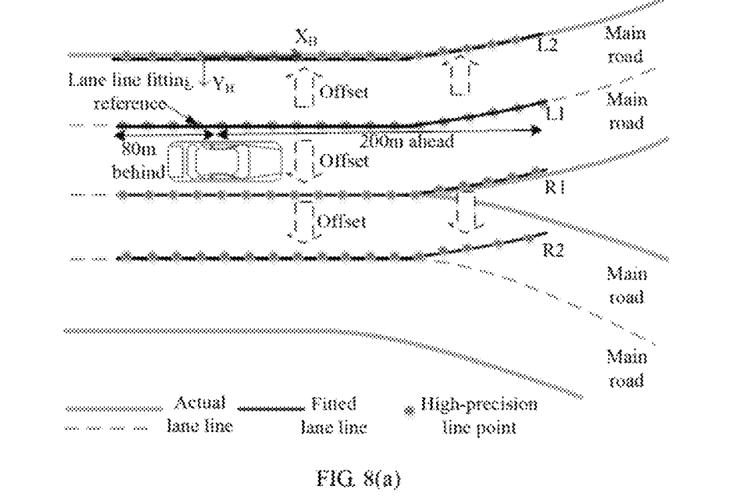
Figure 8B:
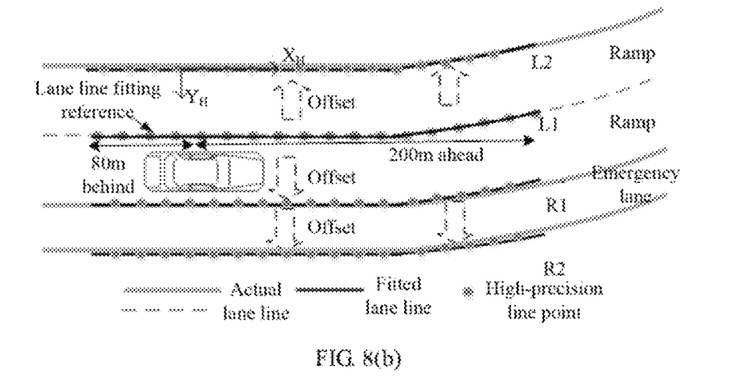
Figure 8C:
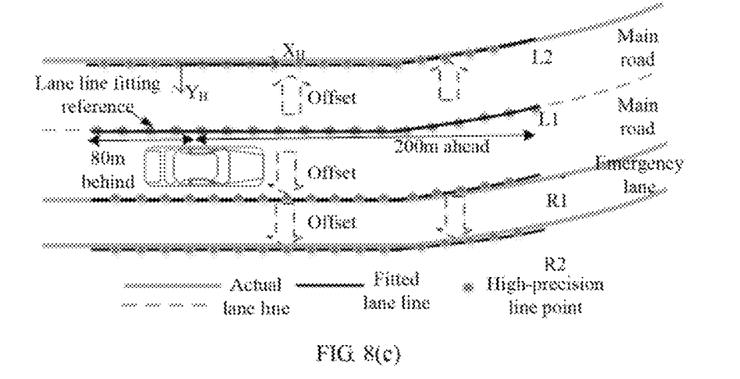
Figure 8D:
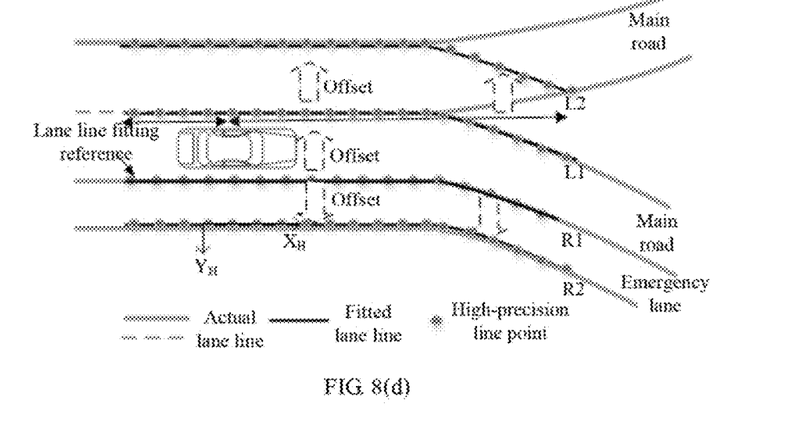
Figure 8E:
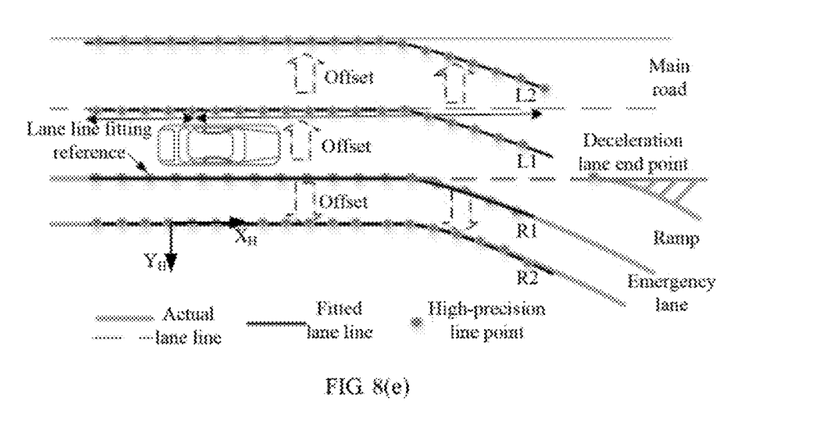

FIG. 8(a) is a schematic diagram of lane line fitting for a separated roadbed. FIG. 8(b) is a schematic diagram of lane line fitting for a conventional ramp, FIG. 8(c) is a schematic diagram of lane line fitting for a conventional main road, FIG. 8(d) is a schematic diagram of lane line fitting for ramp bifurcation, and FIG. 8(e) is a schematic diagram of lane line fitting for departure from a high-speed lane. As shown in FIGS. 8(a)-8(c), the lane line L1 on one side of the direction of the driving coordinate system is selected as the lane line offset reference for offsetting to obtain other lane lines, and a decision-making lane changing signal, such as changing the lane to the left, is received, and the lane line L1 is also used as the lane line offset reference for offsetting to obtain other lane lines. As shown in FIGS. 8(d)-8(e), the lane line R1 on one side of the direction of the driving coordinate system is selected as the lane line offset reference for offsetting to obtain other lane lines, and the vehicle can only change the lane to the right, and the lane line R1 is also used as the lane line offset reference for offsetting to obtain other lane lines.

2) in the case that the actual road working condition is main road narrowing, the road width unchanged side is selected to determine the lane line offset reference.

Figure 9:
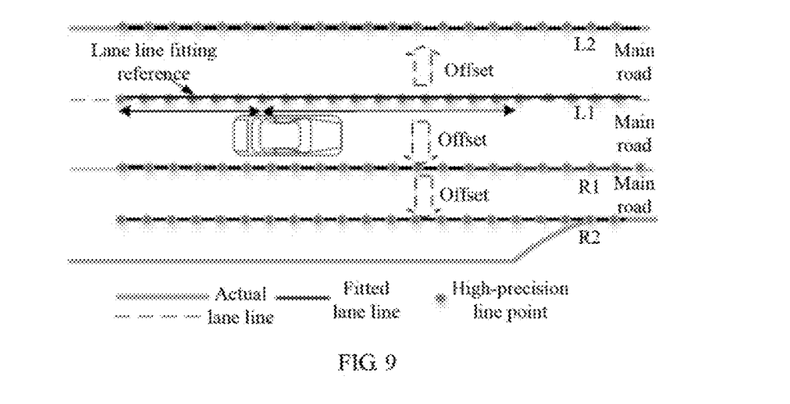
FIG. 9 is a schematic diagram of lane line fitting for main road narrowing.

FIG. 9 is a schematic diagram of lane line fitting for main road narrowing. As shown in FIG. 9, the navigation information prompts that the main road is narrowing on the right and the width on the left side remains unchanged, then the lane line L1 on the left side is used as the lane line offset reference for offsetting to obtain other lane lines.

3) In the case that the actual road working condition is ramp merging or ramp-main road joining, the lane continuous side and/or the reference side of the driving coordinate system are/is selected to determine the lane line offset reference.

Figure 10A:
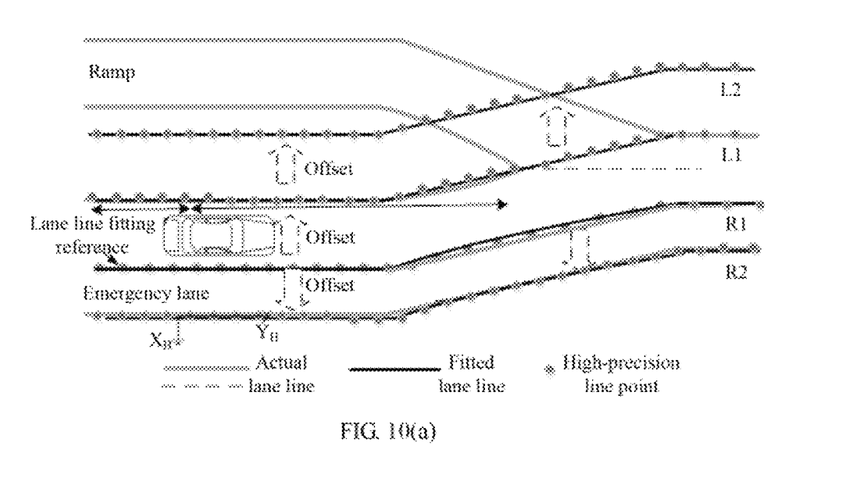
Figure 10B:
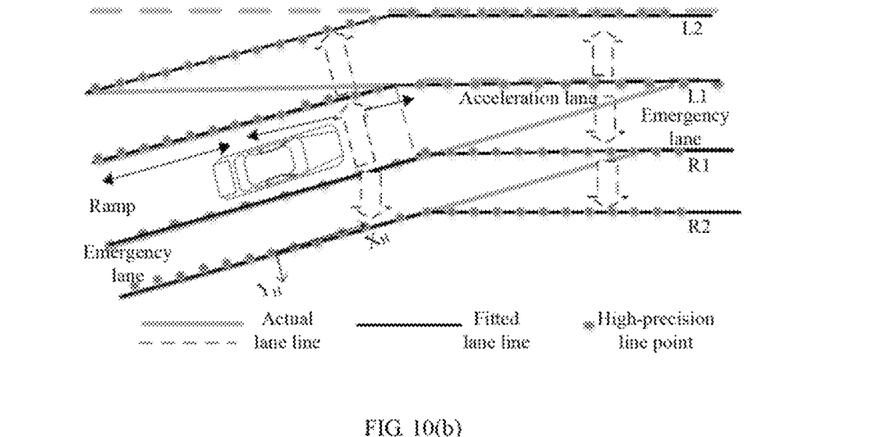

FIG. 10 (a) is a schematic diagram of lane line fitting for ramp merging, and FIG. 10 (b) is a schematic diagram of lane line fitting for ramp-main road joining. As shown in FIG. 10(a), the lane line R1 on one side of the direction of the driving coordinate system is selected as the lane line offset reference for offsetting to obtain other lane lines. Under this road working condition, the number of lanes on the left side of the vehicle is discontinuous (the number of lanes changes), so the lane line R1 of the continuous lane should be used as the lane line offset reference for offsetting to obtain other lane lines. As shown in FIG. 10(b), the lane line R1 on one side of the direction of the driving coordinate system is first selected as the lane line offset reference for offsetting to obtain oilier lane lines. After the start point of the acceleration lane is passed, the driving coordinate system should be switched to the leftmost side of the road, so that the lane line L1 on the left side is changed as the lane line offset reference for offsetting to obtain other lane lines. In addition, under the road working, condition shown in FIG. 10(b), before the start point of the acceleration lane is passed, the number of lanes on the left side of the vehicle is discontinuous (the number of lanes changes), so the lane line R1 of the continuous lane should be used as the lane line offset reference for offsetting to obtain other lane lines. Before the start point of the acceleration lane is passed, the number of lanes on the right side is discontinuous (the number of lanes changes), so the lane line L1 of the continuous lane on the left side should be used as the lane line offset reference for offsetting to obtain other lane lines.

Figure 11A:
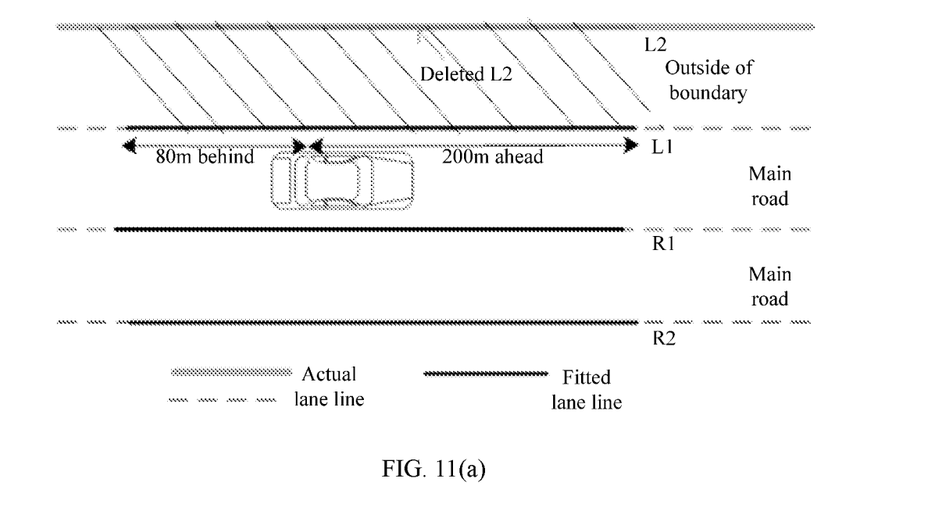
Figure 11B:
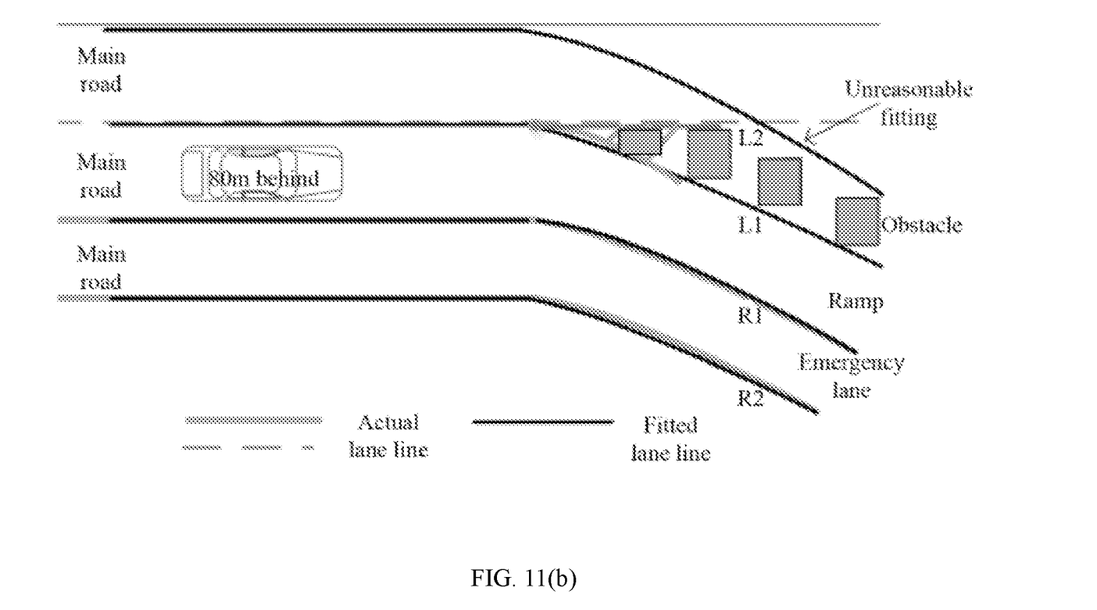

Further, the above example of lane line fitting is output by fitting four lane lines of L1, L2, R1 and R2, but some lane lines, such as L2 or R2, may already be outside the road boundary, and such fitting is not valid. Therefore, the lane line fitting method in the embodiment of the present invention can further comprise: completely or partially deleting, by combining the map information, a lane line that is outside the road boundary of the current road or affected by a road obstacle from the plurality of lane lines, FIG. 11(a) is a schematic diagram of deleting a lane line outside the road boundary of the current road. It can be seen that the fitted L2 does not actually exist, and it should be considered to delete L2. FIG. 11(b) is a schematic diagram of deleting a lane line affected by a road obstacle. It can be seen that part of the fitted is affected by obstacles, and the lane formed by this part of L2 and L1 is actually not passable, so this part of the fitted L2 does not match the actual road plan, and it should be considered to delete this part of unreasonable fitting in L2.

In summary, the lane line fitting method according to the embodiments of the present invention can accurately and quickly determine a lane line offset reference used for lane line fitting, and outputs an effective lane line based on the lane line offset reference, facilitates lane maintaining and other controls, solves the problem that extracted lane lines are numerous and relatively complex in the prior art, can be adapted to different road scenes, and has high processing efficiency of lane line algorithm.

Figure 12:
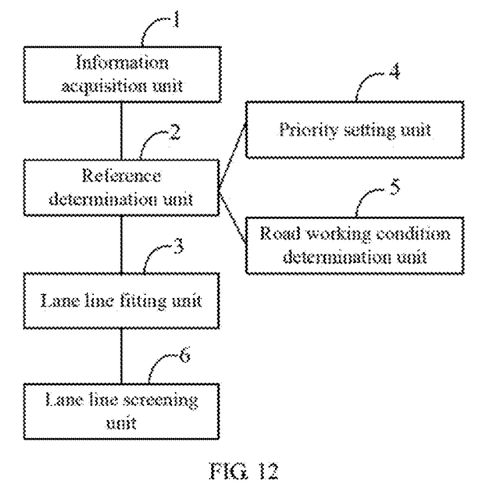
FIG. 12 is a structural schematic diagram of a lane line fitting system according to an embodiment of the present invention.

FIG. 12 is a structural schematic diagram of a lane line fitting system according to an embodiment of the present invention. The lane line fitting system is based on the same inventive idea as the above-mentioned embodiment of the lane line fitting method. As shown in FIG. 12, the lane line fitting system comprises:

an information acquisition unit 1, used for acquiring map information for a current position of a vehicle, wherein the map information comprises the number of lanes, a road width and line point information of lane lines on two sides of the vehicle;

a reference determination unit 2, electrically connected to the information acquisition unit 1, and used for determining, from among the lane lines on two sides of the vehicle, a lane line on one side, consistent with the direction indicated by at least one of the following, to be a lane line offset reference used for lane line fitting: a lane changing direction side, indicating the side to which the vehicle is expected to perform lane changing in the current road; a reference side of a driving coordinate system, wherein the driving coordinate system takes a road boundary line on one side of the road on which the vehicle is located as a reference, and takes a road guide line direction and a direction following a left-hand rule with the road guide line direction as two axes; a road width unchanged side, indicating the side where the road width does not change in the road ahead of the vehicle; and a lane continuous side, indicating the side where the lane continuity does not change in the current road; and a lane line fitting unit 3, electrically connected to the information acquisition unit 1 and the reference determination unit 2, and used for offsetting based on the lane line offset reference to generate a plurality of lane lines of the vehicle, and performing curve fitting on a set of line points on the plurality of generated lane lines to obtain a corresponding lane line equation.

In a preferred embodiment, the information acquisition unit 1 is further used for acquiring a decision-making lane changing signal and/or navigation information for the current position of the vehicle, wherein the decision-making lane changing signal indicates the lane changing direction side of the vehicle, and the navigation information is used for indicating the road width unchanged side.

In a preferred embodiment, the lane line fitting system further comprises: a priority setting unit 4, used for setting the priority of determining the lane line offset reference based on the lane changing direction side, the road width unchanged side, the lane continuous side and the reference side of the driving coordinate system. In addition, the reference determination unit 2 is limber electrically connected to the priority setting unit 4, and used for determining the lane line offset reference based on the priority, set by the priority setting unit, of determining the lane line offset reference based on the lane changing direction side, the road width unchanged side, the lane continuous side and the reference side of the driving coordinate system.

In a more preferred embodiment, the lane line fitting system further comprises: a road working condition determination unit 5, used for determining an actual road working condition of the vehicle according to the map information.

In addition, the reference determination unit 2 is also electrically connected to the road working, condition determination unit 5, and used for selecting, according to the actual road working condition, one or more of the lane changing direction side, the road width unchanged side, the lane continuous side and the reference side of the driving coordinate system to determine the lane line offset reference.

The actual road working condition and the selected lane line offset reference can comprise any one of the following: in the case that the actual road working condition is a separated roadbed, a conventional ramp, a conventional main road, or ramp bifurcation, the lane changing direction side and/or the reference side of the driving coordinate system are/is selected to determine the lane line offset reference; in the case that the actual road working condition is main road narrowing or departure from a high-speed lane, the road width unchanged side is selected to determine the lane line offset reference; and in the case that the actual road working condition is ramp merging or ramp-main road joining, the lane continuous side and/or the reference side of the driving coordinate system areas selected to determine the lane line offset reference.

In a more preferred embodiment, the lane line fitting system further comprises: a lane line screening unit 6, electrically connected to the lane line fitting unit 3, and used for completely or partially deleting, by combining the map information, a lane line that is outside the road boundary of the current road or affected by a road obstacle from the plurality of lane lines.

It should be noted that other implementation details and effects of the lane line fitting system in the embodiments of the present invention can refer to the above-mentioned embodiments of the lane line fitting method, which will not be repeated here.

The above descriptions are only the preferred embodiments of the present invention and are not intended to limit the present invention. Any modification, equivalent replacement, improvement, etc., made within the spirit and principle of the present invention, such as adaptively changing the order of execution of steps and adjusting the connection relationship between functional modules, shall be comprised in the protection scope of the present invention.

A person skilled in the art can understand that all or part of the steps in the method of the foregoing embodiments can be implemented by a program instructing related hardware. The program is stored in a storage medium, and comprises several instructions for causing a single chip computer, a chip, or a processor to execute all or part of the steps of the method described in each embodiment of the present application. In addition, the aforementioned storage medium comprises various kinds of mediums that may store program codes, such as a U disk, a mobile hard disk, a Read-Only Memory (ROM), a Random Access Memory (RAM), a magnetic disk or an optical disk.

In addition, any combination of the various embodiments of the present invention can be made therebetween, which, as long as not violating the idea of the embodiments of the present invention, shall likewise be considered as contents disclosed in the embodiments of the present invention.

The invention claimed is:

1. A lane line fitting method, wherein the method comprises:

acquiring map information for a current position of a vehicle, wherein the map information comprises a number of lanes, a road width and line point information of lane lines on two sides of the vehicle;

determining, from among the lane lines on two sides of the vehicle, a lane line on one side, consistent with the direction indicated by at least one of the following, to be a lane line offset reference used for lane line fitting:

a lane changing direction side, indicating the side to which the vehicle is expected to perform lane changing in the current road;

a reference side of a driving coordinate system, wherein the driving coordinate system takes a road boundary line on one side of the road on which the vehicle is located as a reference, and takes a road guide line direction and a direction following a left-hand rule with the road guide line direction as two axes;

a road width unchanged side, indicating the side where the road width does not change in the road ahead of the vehicle; and a lane continuous side, indicating the side where the lane continuity does not change in the current road;

setting the priority of determining the lane line offset reference based on the lane changing direction side, the road width unchanged side, the lane continuous side and the reference side of the driving coordinate system; and offsetting based on the lane line offset reference to generate a plurality of lane lines of the vehicle, and performing curve fitting on a set of line points on the plurality of generated lane lines to obtain a corresponding lane line equation.

2. The lane line fitting method according to claim 1, wherein the method further comprises:

acquiring a decision-making lane changing signal and/or navigation information for the current position of the vehicle, wherein the decision-making lane changing signal indicates the lane changing direction side of the vehicle, and the navigation information is used for indicating the road width unchanged side.

3. A lane line fitting system, wherein the system comprises:

a memory, configured to store programs that can be executed on a processor; and the processor, configured to implement the lane line fitting method according to claim 2 when executing the programs.

4. The lane line fitting method according to claim 1, wherein the method further comprises:

determining an actual road working condition of the vehicle according to the map information, and selecting, according to the actual road working condition, one or more of the lane changing direction side, the road width unchanged side, the lane continuous side and the reference side of the driving coordinate system to determine the lane line offset reference.

5. The lane line fitting method according to claim 4, wherein the actual road working condition and the selected lane line offset reference comprise any one of the following:

in the case that the actual road working condition is a separated roadbed, a conventional ramp, a conventional main road, ramp bifurcation or departure from a high-speed lane, the lane changing direction side and/or the reference side of the driving coordinate system are/is selected to determine the lane line offset reference;

in the case that the actual road working condition is main road narrowing, the road width unchanged side is selected to determine the lane line offset reference; and in the case that the actual road working condition is ramp merging or ramp-main road joining, the lane continuous side and/or the reference side of the driving coordinate system are/is selected to determine the lane line offset reference.

6. A lane line fitting system, wherein the system comprises:

a memory, configured to store programs that can be executed on a processor; and the processor, configured to implement the lane line fitting method according to claim 5 when executing the programs.

7. A lane line fitting system, wherein the system comprises:

a memory, configured to store programs that can be executed on a processor; and the processor, configured to implement the lane line fitting method according to claim 4 when executing the programs.

8. The lane line fitting method according to claim 1, wherein the method further comprises:

completely or partially deleting, by combining the map information, a lane line that is outside the road boundary of the current road or affected by a road obstacle from the plurality of lane lines.

9. A lane line fitting system, wherein the system comprises:

a memory, configured to store programs that can be executed on a processor; and the processor, configured to implement the lane line fitting method according to claim 8 when executing the programs.

10. A lane line fitting system, wherein the system comprises:

a memory, configured to store programs that can be executed on a processor; and the processor, configured to implement the lane line fitting method according to claim 1 when executing the programs.

11. A non-transitory machine-readable storage medium, wherein an instruction is stored on the machine-readable storage medium, and the instruction is used for causing a controller to execute the following lane line fitting method, the method comprises:

acquiring map information for a current position of a vehicle, wherein the map information comprises a number of lanes, a road width and line point information of lane lines on two sides of the vehicle;

determining, from among the lane lines on two sides of the vehicle, a lane line on one side, consistent with the direction indicated by at least one of the following, to be a lane line offset reference used for lane line fitting:

a lane changing direction side, indicating the side to which the vehicle is expected to perform lane changing in the current road;

a reference side of a driving coordinate system, wherein the driving coordinate system takes a road boundary line on one side of the road on which the vehicle is located as a reference, and takes a road guide line direction and a direction following a left-hand rule with the road guide line direction as two axes;

a road width unchanged side, indicating the side where the road width does not change in the road ahead of the vehicle; and a lane continuous side, indicating the side where the lane continuity does not change in the current road;

setting the priority of determining the lane line offset reference based on the lane changing direction side, the road width unchanged side, the lane continuous side and the reference side of the driving coordinate system; and offsetting based on the lane line offset reference to generate a plurality of lane lines of the vehicle, and performing curve fitting on a set of line points on the plurality of generated lane lines to obtain a corresponding lane line equation.

12. The non-transitory machine-readable storage medium according to claim 11, wherein the method further comprises:

acquiring a decision-making lane changing signal and/or navigation information for the current position of the vehicle, wherein the decision-making lane changing signal indicates the lane changing direction side of the vehicle, and the navigation information is used for indicating the road width unchanged side.

13. The non-transitory machine-readable storage medium according to claim 12, wherein the method further comprises:
   determining an actual road working condition of the vehicle according to the map information, and selecting, according to the actual road working condition, one or more of the lane changing direction side, the road width unchanged side, the lane continuous side and the reference side of the driving coordinate system to determine the lane line offset reference.

14. The non-transitory machine-readable storage medium according to claim 11, wherein the actual road working condition and the selected lane line offset reference comprise any one of the following:
   in the case that the actual road working condition is a separated roadbed, a conventional ramp, a conventional main road, ramp bifurcation or departure from a high-speed lane, the lane changing direction side and/or the reference side of the driving coordinate system are/is selected to determine the lane line offset reference;
   in the case that the actual road working condition is main road narrowing, the road width unchanged side is selected to determine the lane line offset reference; and
   in the case that the actual road working condition is ramp merging or ramp-main road joining, the lane continuous side and/or the reference side of the driving coordinate system are/is selected to determine the lane line offset reference.

15. The non-transitory machine-readable storage medium according to claim 11, wherein the method further comprises:
   completely or partially deleting, by combining the map information, a lane line that is outside the road boundary of the current road or affected by a road obstacle from the plurality of lane lines.

* * * * *